(12) United States Patent
Depraete

(10) Patent No.: US 10,047,847 B2
(45) Date of Patent: Aug. 14, 2018

(54) TORQUE CONVERTER AND HYDROKINETIC TORQUE COUPLING DEVICE HAVING CORE LOCKUP CLUTCH, AND RELATED METHODS

(71) Applicant: Valeo Embrayages, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/612,083

(22) Filed: Jun. 2, 2017

(65) Prior Publication Data

US 2017/0268653 A1   Sep. 21, 2017

Related U.S. Application Data

(63) Continuation of application No. PCT/EP2015/076890, filed on Nov. 17, 2015, which
(Continued)

(51) Int. Cl.
*F16H 45/02* (2006.01)
*F16H 41/24* (2006.01)

(52) U.S. Cl.
CPC ............ *F16H 45/02* (2013.01); *F16H 41/24* (2013.01); *F16H 2045/0205* (2013.01);
(Continued)

(58) Field of Classification Search
None
See application file for complete search history.

(56) References Cited

U.S. PATENT DOCUMENTS

| 2,130,895 A | 9/1938 | Ness |
| 2,860,747 A | 11/1958 | Kelley |

(Continued)

FOREIGN PATENT DOCUMENTS

| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter 20, pp. 280-301.
(Continued)

*Primary Examiner* — Jacob S. Scott
(74) *Attorney, Agent, or Firm* — Berenato & White, LLC

(57) ABSTRACT

A hydrokinetic torque converter includes an impeller, an axially displaceable turbine piston, and impeller and turbine-piston lockup clutch core plates. The impeller lockup clutch core plate is situated between the impeller shell and the turbine-piston shell, is connected to an impeller core ring, and has a first surface. The turbine-piston lockup clutch core plate is situated between the impeller shell and the turbine-piston shell, is connected to a turbine-piston core ring, and is axially displaceable with the turbine-piston to move a second surface of the turbine-piston lockup clutch core plate axially towards and away from the first surface for positioning the torque converter respectively into and out of a lockup mode in which the turbine-piston is mechanically interlocked to the impeller.

19 Claims, 15 Drawing Sheets

Related U.S. Application Data is a continuation of application No. 14/562,253, filed on Dec. 5, 2014, now Pat. No. 9,523,420.

(52) U.S. Cl.
CPC ............... *F16H 2045/0263* (2013.01); *F16H 2045/0284* (2013.01); *F16H 2045/0294* (2013.01)

(56) References Cited

U.S. PATENT DOCUMENTS

| | | | |
|---|---|---|---|
| 2,903,912 | A | 9/1959 | Edsall |
| 2,920,728 | A * | 1/1960 | Forster ................... F16H 61/14 192/3.29 |
| 2,992,713 | A | 7/1961 | Stump et al. |
| 3,041,892 | A | 7/1962 | Schjolin |
| 3,126,079 | A | 3/1964 | Howard |
| 3,252,352 | A | 5/1966 | General et al. |
| 4,041,701 | A | 8/1977 | Goto et al. |
| 4,290,513 | A * | 9/1981 | Nishimura .......... F16H 61/0009 192/3.22 |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 7,837,018 | B2 | 11/2010 | Nakamura |
| 8,161,739 | B2 | 4/2012 | Degler |
| 8,276,723 | B2 | 10/2012 | Verhoog et al. |
| 8,479,901 | B2 | 7/2013 | Engelmann |
| 9,297,448 | B1 | 3/2016 | Depraete |
| 9,341,250 | B1 | 5/2016 | Depraete |
| 9,441,718 | B2 | 9/2016 | Depraete |
| 9,528,586 | B2 | 12/2016 | Depraete |
| 9,541,181 | B2 | 1/2017 | Depraete |
| 9,562,597 | B2 | 2/2017 | Depraete |
| 9,562,598 | B2 | 2/2017 | Depraete |
| 9,574,649 | B2 | 2/2017 | Depraete |
| 9,593,755 | B2 | 3/2017 | Depraete |
| 9,599,206 | B2 | 3/2017 | Depraete |
| 2003/0168298 | A1 | 9/2003 | Holler et al. |
| 2003/0168299 | A1 | 9/2003 | Holler et al. |
| 2004/0011032 | A1 | 1/2004 | Holler et al. |
| 2006/0086584 | A1 | 4/2006 | Maucher et al. |
| 2012/0080281 | A1 | 4/2012 | Takikawa |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0152951 | A1 | 6/2015 | Renffrow |
| 2015/0362041 | A1 | 12/2015 | Lee et al. |
| 2016/0102746 | A1 | 4/2016 | Depraete |
| 2016/0116038 | A1 | 4/2016 | Depraete |
| 2016/0116040 | A1 | 4/2016 | Werthman |
| 2016/0116041 | A1 | 4/2016 | Depraete |
| 2016/0160971 | A1 | 6/2016 | Depraete |
| 2016/0160975 | A1 | 6/2016 | Lee |
| 2016/0245384 | A1 | 8/2016 | Frary |
| 2016/0305525 | A1 | 10/2016 | Depraete |

FOREIGN PATENT DOCUMENTS

| | | |
|---|---|---|
| DE | 19920542 A1 | 11/1999 |
| DE | 10226860 A1 | 12/2003 |
| DE | 102010033552 A1 | 2/2012 |
| EP | 0125428 A1 | 11/1984 |
| EP | 1744074 | 1/2007 |
| EP | 2149727 A1 | 2/2010 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 460838 A | 1/1937 |
| GB | 598811 | 2/1948 |
| JP | 58-131466 A | 8/1983 |
| JP | 2004332801 A | 11/2004 |
| JP | 2006200607 A | 8/2006 |
| KR | 101311531 B1 | 9/2013 |
| WO | WO2004018897 | 3/2004 |
| WO | 2004046574 A1 | 6/2004 |
| WO | WO2011110310 A2 | 9/2011 |
| WO | WO2012043677 A1 | 4/2012 |

OTHER PUBLICATIONS

ISR of corresponding PCT/EP2015/076890.
Written Opinion of corresponding PCT/EP2015/076890.

\* cited by examiner

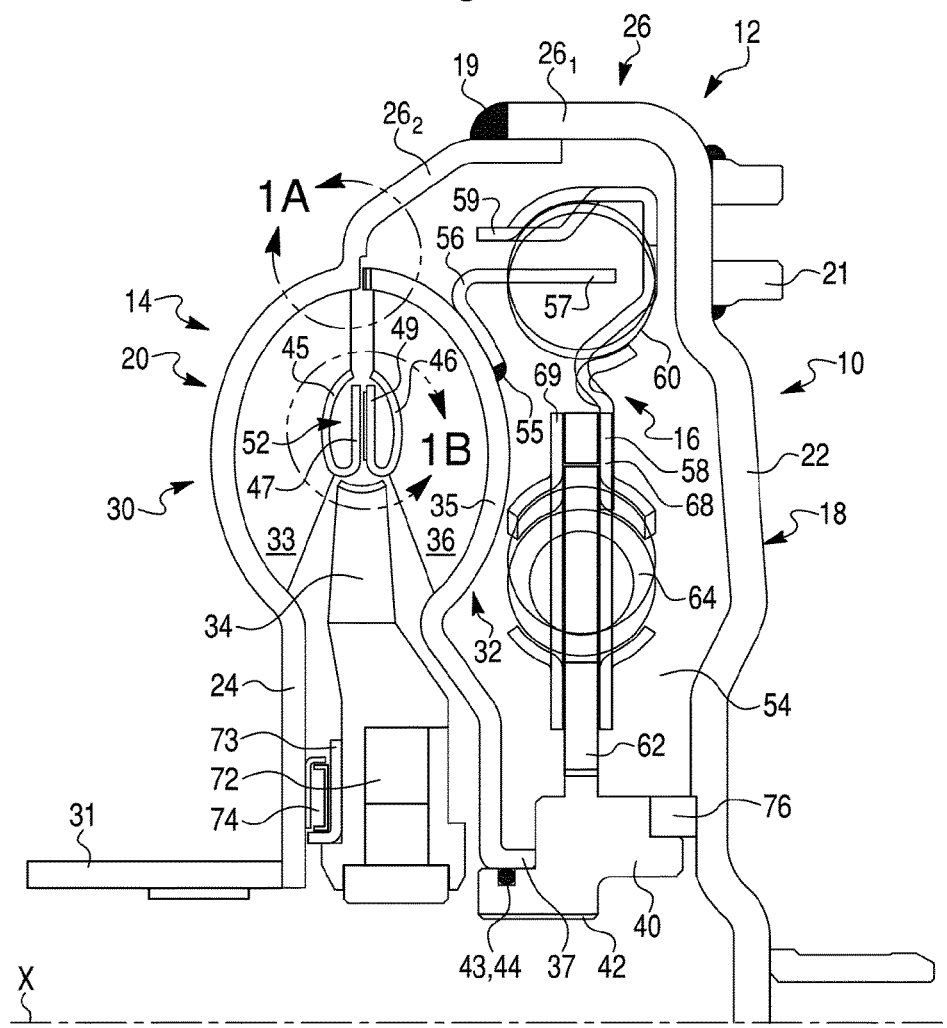

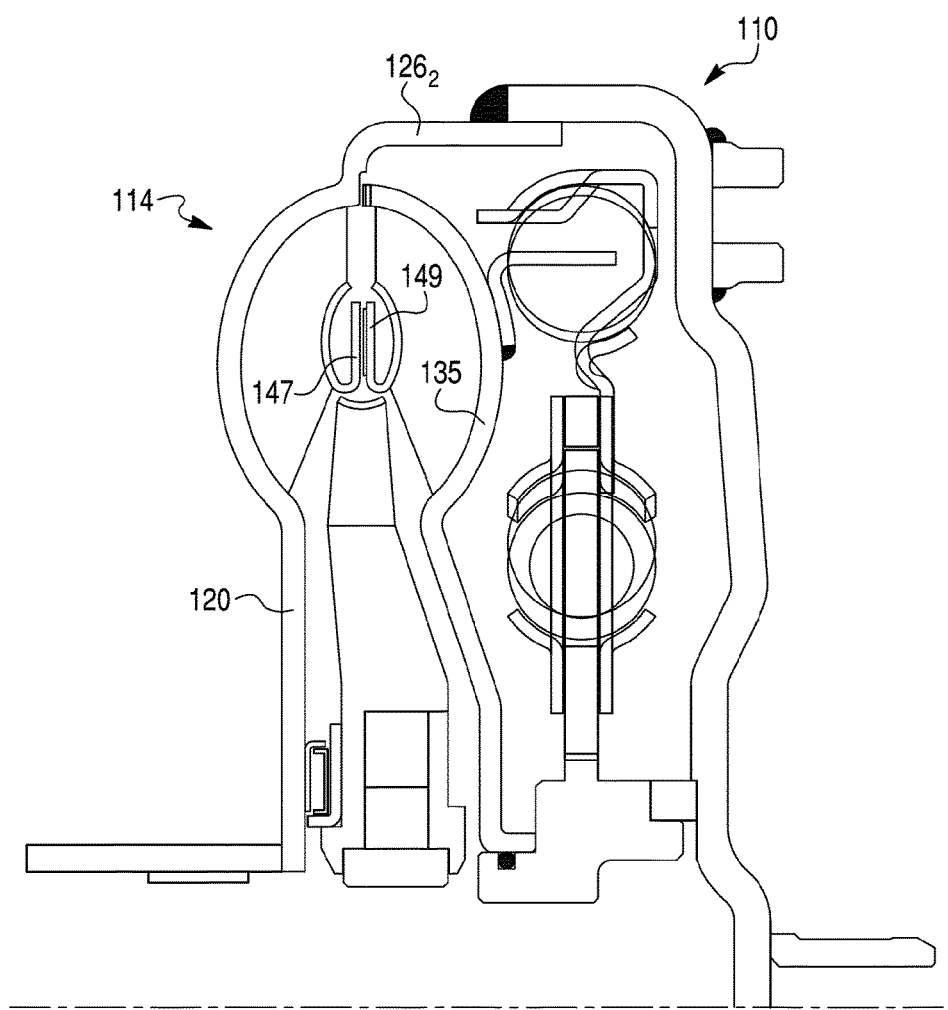

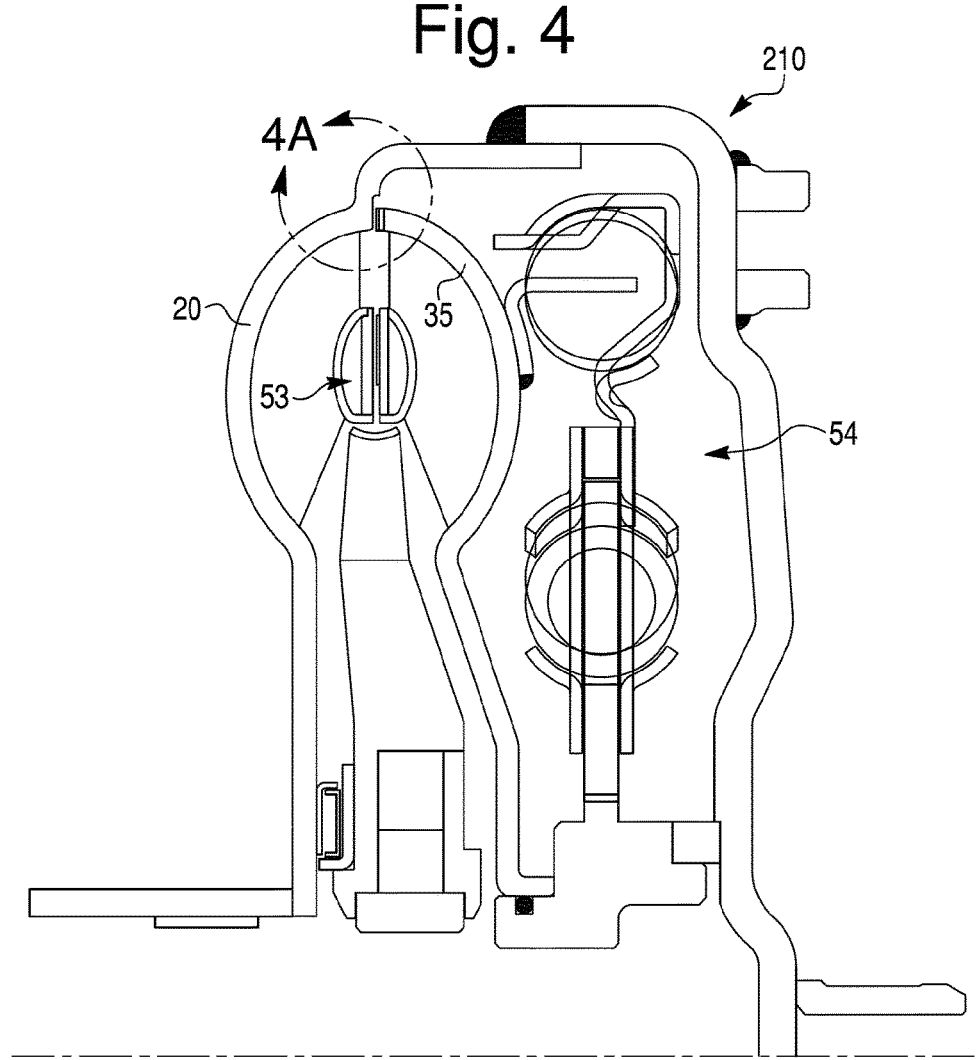

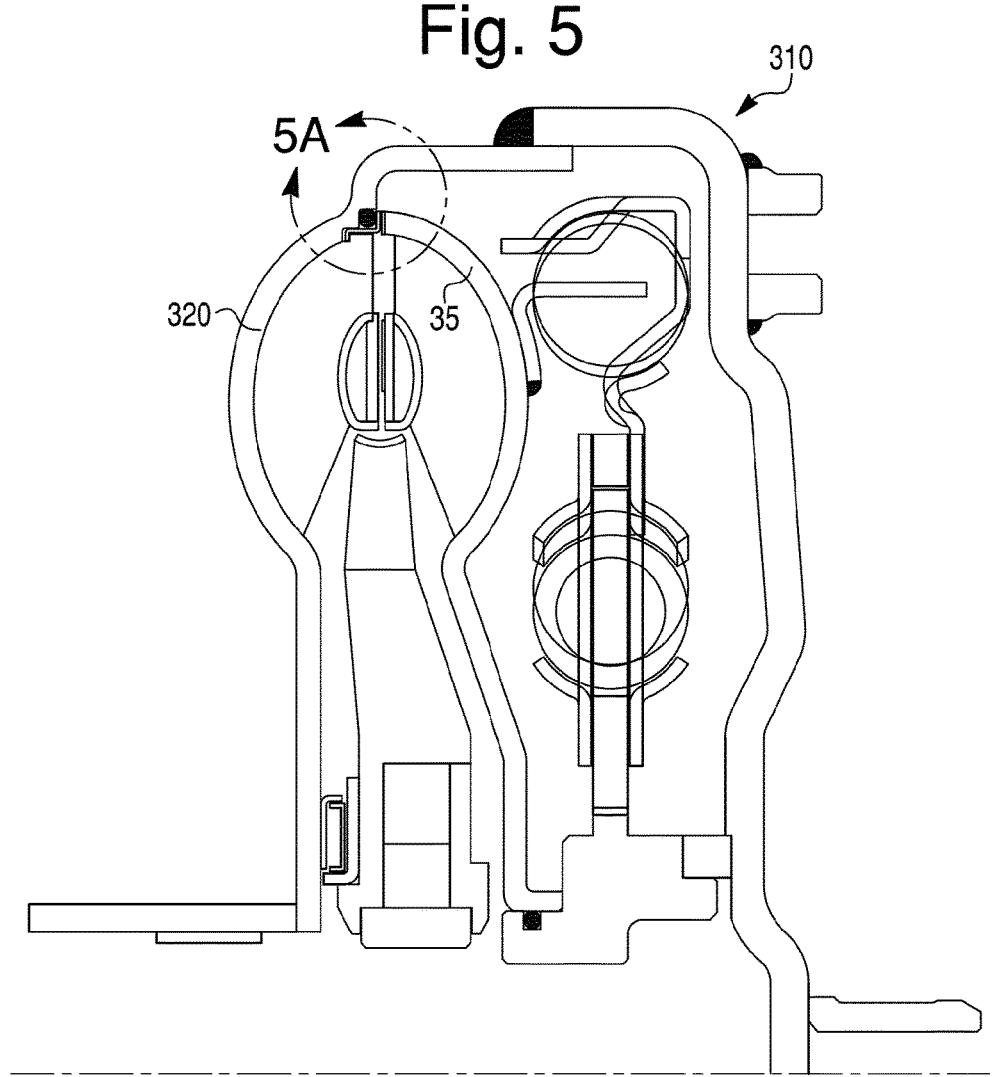

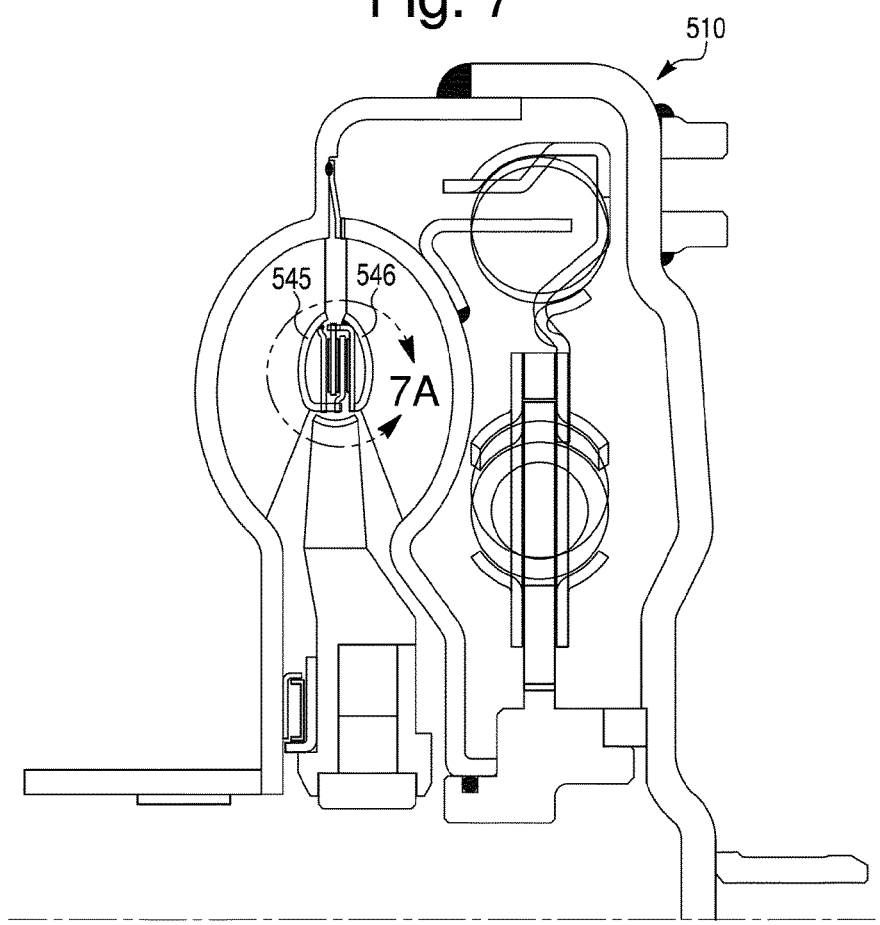

TORQUE CONVERTER AND HYDROKINETIC TORQUE COUPLING DEVICE HAVING CORE LOCKUP CLUTCH, AND RELATED METHODS

CROSS-REFERENCE TO RELATED APPLICATIONS AND CLAIM TO PRIORITY

This application is a by-pass continuation of International Patent Application No. PCT/EP2015/076890, filed Nov. 17, 2015, which is a continuation of U.S. patent application Ser. No. 14/562,253, filed Dec. 5, 2014, now U.S. Pat. No. 9,523,420, the disclosures of which are incorporated herein by reference and to which priority is claimed.

BACKGROUND OF THE INVENTION

1. Field of the Invention

The present invention generally relates to torque converters and hydrokinetic torque coupling devices, and more particularly to torque converters and hydrokinetic torque coupling devices including core lockup clutches for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device, consolidating functions of two or more components into a single component, and/or improving lockup operation.

BRIEF SUMMARY OF THE INVENTION

According to a first aspect of the invention, a torque converter is provided that includes an impeller, a turbine-piston, and impeller and turbine-piston lockup clutch core plates. The impeller includes an impeller core ring, an impeller shell, and a plurality of impeller blades extending between the impeller core ring and the impeller shell. The turbine-piston is axially displaceable relative to, is coaxially aligned with, and is hydrodynamically drivable by the impeller. The turbine-piston includes a turbine-piston core ring, a turbine-piston shell, and a plurality of turbine blades extending between the turbine-piston core ring and the turbine-piston shell. The impeller lockup clutch core plate is situated between the impeller shell and the turbine-piston shell, is connected to and non-rotatable relative to the impeller core ring, and has a first surface. The turbine-piston lockup clutch core plate is situated between the impeller shell and the turbine-piston shell, is connected to and non-rotatable relative to the turbine-piston core ring, and is axially displaceable with the turbine-piston to move a second surface of the turbine-piston lockup clutch core plate axially towards and away from the first surface for positioning the torque converter respectively into and out of a lockup mode in which the turbine-piston is mechanically interlocked with the impeller so as to be non-rotatable relative to the impeller.

A second aspect of the invention provides a hydrokinetic torque coupling device for coupling a driving shaft and a driven shaft together. The device includes an impeller, a turbine-piston, a casing, a damper assembly, an impeller lockup clutch core plate, and a turbine-piston lockup clutch core plate. The impeller includes an impeller core ring, an impeller shell, and a plurality of impeller blades extending between the impeller core ring and the impeller shell. The turbine-piston is axially displaceable relative to, coaxially aligned with, and hydrodynamically drivable by the impeller. The turbine-piston includes a turbine-piston core ring, a turbine-piston shell, and a plurality of turbine blades extending between the turbine-piston core ring and the turbine-piston shell. The casing includes a casing shell connected to the impeller shell. The damper assembly includes an input part operatively connected to the turbine-piston and an output part operatively connectable to an output hub. The impeller lockup clutch core plate is situated between the impeller shell and the turbine-piston shell, is connected to and non-rotatable relative to the impeller core ring, and has a first surface. The turbine-piston lockup clutch core plate is situated between the impeller shell and the turbine-piston shell, is connected to and non-rotatable relative to the turbine-piston core ring, and is axially displaceable with the turbine-piston to move a second surface of the turbine-piston lockup clutch core plate axially towards and away from the first surface for positioning the hydrokinetic torque coupling device respectively into and out of a lockup mode in which the turbine-piston is mechanically interlocked with the casing so as to be non-rotatable relative to the casing.

A third aspect of the invention provides a method of assembling a hydrokinetic torque coupling device for coupling a driving shaft and a driven shaft together. A torque converter is provided that includes an impeller, a turbine-piston, and impeller and turbine-piston lockup clutch core plates. The impeller includes an impeller core ring, an impeller shell, and a plurality of impeller blades extending between the impeller core ring and the impeller shell. The turbine-piston is axially displaceable relative to, coaxially aligned with, and hydrodynamically drivable by the impeller. The turbine-piston includes a turbine-piston core ring, a turbine-piston shell, and a plurality of turbine blades extending between the turbine-piston core ring and the turbine-piston shell. The impeller lockup clutch core plate is situated between the impeller shell and the turbine-piston shell, is connected to and non-rotatable relative to the impeller core ring, and has a first surface. The turbine-piston lockup clutch core plate is situated between the impeller shell and the turbine-piston shell, is connected to and non-rotatable relative to the turbine-piston core ring, and has a second surface. The torque converter is operatively connected to a casing shell and a damper assembly including an input part and an output part operatively connectable to an output hub to assemble the hydrokinetic torque coupling device. The turbine-piston lockup clutch core plate is axially displaceable with the turbine-piston to move the second surface of the turbine-piston lockup clutch core plate axially towards and away from the first surface for positioning the hydrokinetic torque coupling device respectively into and out of a lockup mode in which the turbine-piston is mechanically interlocked with the casing so as to be non-rotatable relative to the casing.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 1 is a fragmented half-view in axial cross section of a hydrokinetic torque coupling device equipped with a core lockup clutch shown in a non-lockup mode in accordance with a first exemplary embodiment of the present invention;

FIG. 3 is a fragmented half-view in axial cross section of a hydrokinetic torque coupling device equipped with a core lockup clutch in accordance with a second exemplary embodiment of the present invention;

FIG. 4 is a fragmented half-view in axial cross section of a hydrokinetic torque coupling device equipped with a core lockup clutch in accordance with a third exemplary embodiment of the present invention;

FIG. 5 is a fragmented half-view in axial cross section of a hydrokinetic torque coupling device equipped with a core lockup clutch in accordance with a fourth exemplary embodiment of the present invention;

FIG. 7 is a fragmented half-view in axial cross section of a hydrokinetic torque coupling device equipped with a core lockup clutch in accordance with a sixth exemplary embodiment of the present invention;

Figure 1A:
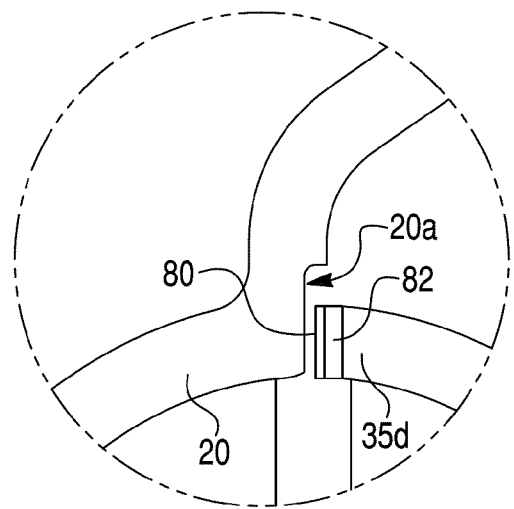
FIG. 1A is an enlarged fragmentary view of circle 1A of FIG. 1 in a non-lockup mode.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 1B:
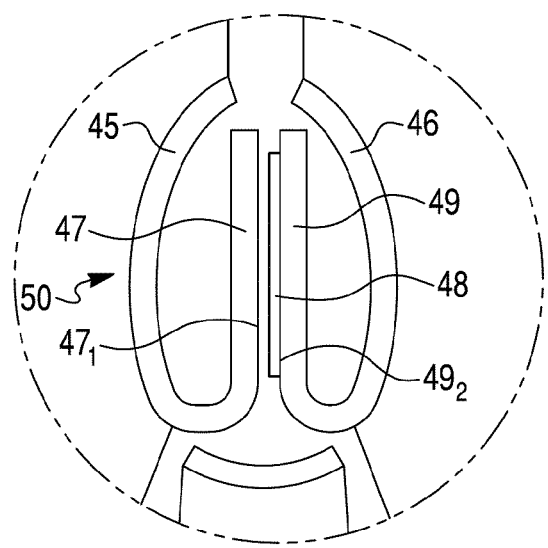
FIG. 1B is an enlarged fragmentary view of circle 1B of FIG. 1 in non-lockup mode.
Figure 2:
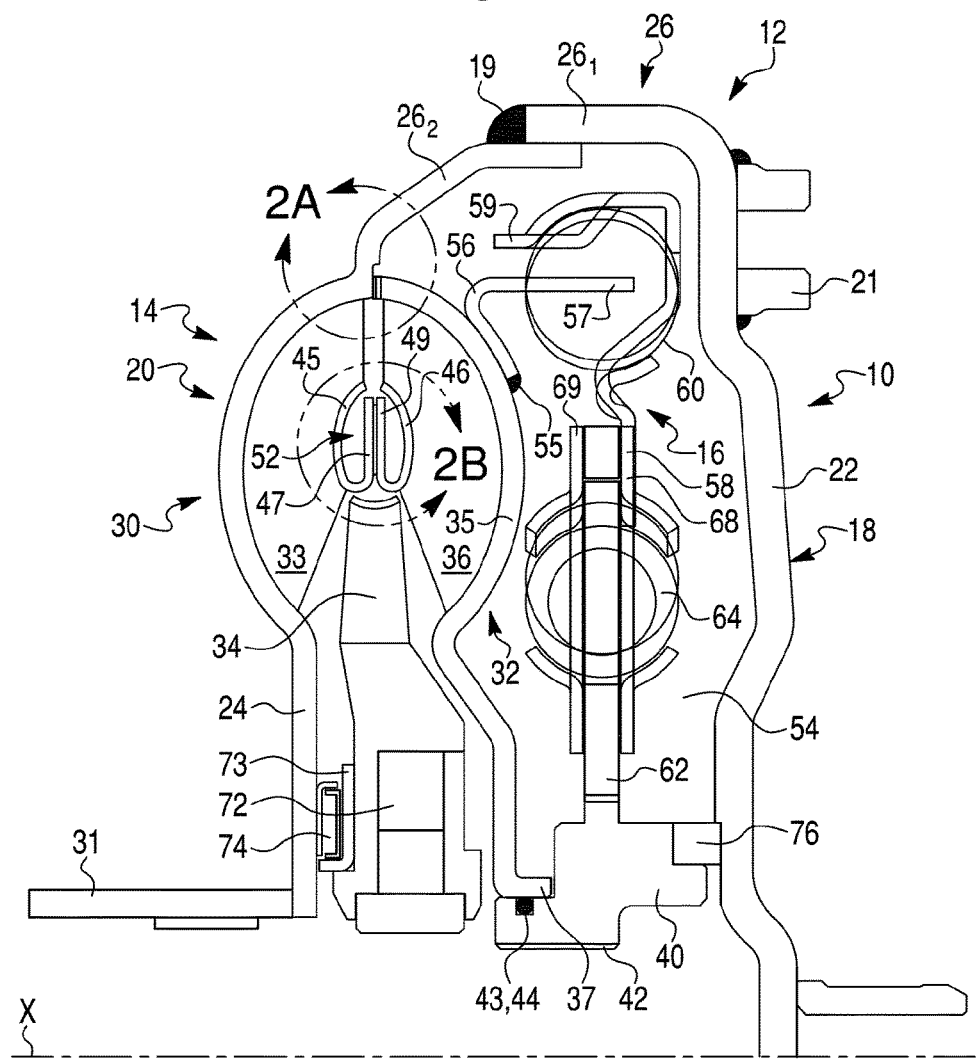
FIG. 2 is a fragmented half-view in axial cross section of the hydrokinetic torque coupling device of the first exemplary embodiment, showing the core lockup clutch in a lockup mode.

A first exemplary embodiment of a hydrokinetic torque coupling device is generally represented in the accompanying drawings by reference numeral 10, as best shown in the fragmentary sectional views of FIGS. 1 and 2. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross section of a portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIGS. 1 and 2 includes a first casing shell 18 and a second casing shell 20 interconnected sealingly together, such as by weld 19 at their outer peripheries, so as to be non-movable relative to one another yet rotatable about axis X. The first shell 18 is interconnected and non-rotatable relative to the driving shaft, more typically a flywheel (not shown) that is fixed to and non-rotatable relative to the driving shaft, so that the casing 12 turns at the same speed that the engine operates for transmitting torque. Specifically, in the illustrated embodiment of FIGS. 1 and 2 the casing 12 is rotatably driven by the internal combustion engine and is coupled to and non-rotatable relative to the flywheel with studs 21. Each of the first and second casing shells 18, 20 may be made, for example, integrally by press-forming one-piece metal sheets.

Figure 2A:
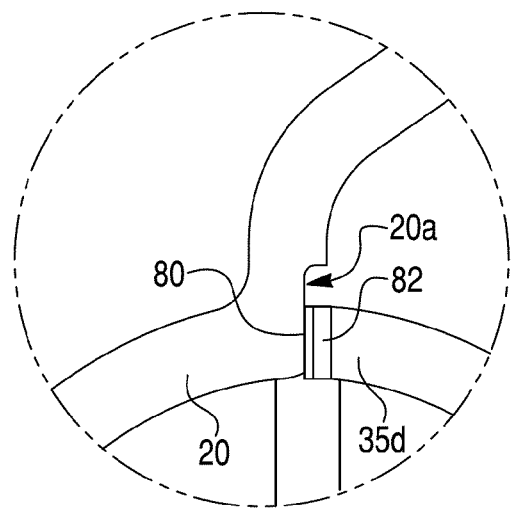
FIG. 2A is an enlarged fragmentary view of circle 2A of FIG. 2 in lockup mode.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 towards the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$. As discussed in greater detail below, and as best shown in FIGS. 1A and 2A with respect to the first embodiment, the second casing shell 20 includes an impeller shell recess 20a which may be formed, for example, by conventional machining practice.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller shell 20 and the impeller core ring 45. The impeller 30, including its shell 20, the impeller core ring 45, and the impeller blades 33, is secured to and non-rotatably relative to the casing shell 18 and hence to the drive shaft (or flywheel) of the engine so that the impeller 30 rotates at the same speed as the engine output. The impeller 30 includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a turbine-piston core ring 46, and a plurality of turbine-piston blades 36 fixedly attached, such as by brazing, to the turbine-piston shell 35 and the turbine-piston core ring 46. The spinning of the impeller 30 causes transmission fluid in the torus to spin the turbine blades 36, and hence the turbine-piston core ring 46 and shell 35. Substantially toroidal portions of the impeller shell 20 and the turbine-piston shell 35 collective define a substantially toroidal inner chamber (or torus chamber) 52 therebetween. As discussed in further detail below, a drive component 56 is affixed to the toroidal portion of the turbine-piston shell 35, such as by an annular weld and/or fasteners 55.

An annular impeller lockup clutch core plate 47 is situated in the core of the torus chamber 52. The impeller lockup clutch core plate 47 is connected to, axially spaced from and optionally integrally formed as a single piece with, the impeller core ring 45. As best shown in FIG. 1B, the impeller lockup clutch core plate 47 includes a first engagement surface $47_1$ extending radially relative to rotational axis X.

Figure 2B:
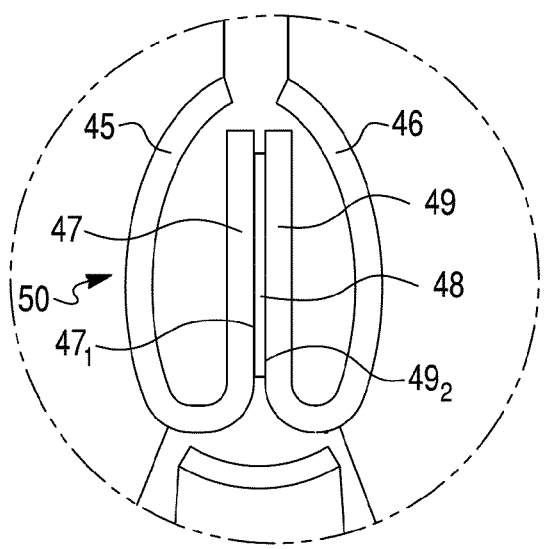
FIG. 2B is an enlarged fragmentary view of circle 2B of FIG. 2 in lockup mode.

An annular turbine-piston lockup clutch core plate 49 is situated in the core of the torus chamber 52 and is connected to, axially spaced from and optionally integrally formed as a single piece with as shown in FIGS. 1B and 2B, the turbine-piston core ring 46. The turbine-piston lockup clutch core plate 49 is axially displaceable with the turbine-piston 32 to move a second engagement surface $49_2$ of the turbine-piston lockup clutch core plate 49 axially towards and away from the first engagement surface $47_1$ for positioning the torque converter 14 respectively into and out of a lockup mode. The lockup clutch core plates 47, 49 are shown extending radially parallel to one another, and are generally surrounded by the blades 33, 36 and the stator 34 radially inward of the core plates 47, 49.

In accordance with the first exemplary embodiment, the second engagement surface $49_2$ is provided with a friction ring (or friction lining) 48, best shown in FIG. 1B, which shows the lockup clutch 50 out of lockup mode. The friction ring 48 may be secured to the second engagement surface $49_2$, for example, by adhesive bonding and/or with fasteners. The friction ring 48 is made of a friction material for improved frictional performance. Alternatively, the first engagement surface $47_1$ may include friction ring (or friction lining). According to still another embodiment, the first engagement surface $47_1$ has a first friction ring or liner and the second (engagement) surface $49_2$ has a second friction ring or liner. It is within the scope of the invention to omit one or both of the friction rings.

In the lockup mode depicted in FIG. 2, the first and second engagement surfaces $47_1$ and $49_2$ (including friction ring(s) 48 secured thereto) are pressed together into frictional engagement such that the turbine-piston 32 is mechanically interlocked to the impeller 30. Because the impeller 30 is affixed to and non-rotatable relative to the casing 12, in the lockup mode the turbine-piston 32 is mechanically interlocked to so as to be non-rotatable relative to the casing 12. When not in the lockup mode, as depicted in FIGS. 1 and 1B, the first and second engagement surfaces $47_1$ and $49_2$ are spaced from one another, such that the turbine-piston 32 is not mechanically interlocked with the casing 12. In the non-lockup mode, normal operation of the torque converter 14 selectively fluidly couples and decouples the impeller 30 to and from the turbine-piston 32 to operate in a hydrodynamic transmission mode.

Returning to FIG. 1, the stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall plate 73 of the stator 34 and the impeller shell 20 of the casing 12.

The hydrokinetic torque coupling device 10 further includes an output hub (also referred to as a hub) 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. Although not shown, a sealing member may be mounted to a radially inner surface of the output hub 40 to create a seal at its interface with the transmission input shaft.

Extending axially at a radially inner peripheral end of the turbine-piston shell 35 is a substantially cylindrical flange 37 that is proximate to the rotational axis X relative to an opposite distal end 35d of the turbine-piston shell 35. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movably relative to the output hub 40 along this interface.

The damper assembly 16 is housed in the casing 12 axially between the turbine-piston 32 and the first casing shell 18, as shown in FIGS. 1 and 2. The damper assembly 16 is connected to the drive member 56, and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIGS. 1 and 2 and other embodiments discussed herein, the first and second damping members 60, 64 are configured as helical (or coil) springs having principal axes oriented substantially circumferentially. Other elastic members may be selected to replace or supplement the springs.

The drive member 56 includes a plurality of driving tabs 57 extending axially in the direction away from the turbine-piston 32. The driving tabs 57 of the drive member 56 are circumferentially equidistantly spaced from one another, and engage circumferential ends of the first damping members 60. The intermediate member 58 has a plurality of driven tabs 59 extending axially in an opposition direction to the driving tabs 57 of the drive member 56. The driven tabs 59 of the intermediate member 58 are circumferentially equidistantly spaced from one another, and engage the opposite circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston 32 between its lockup and non-lockup modes. As discussed in greater detail below, when the turbine-piston 32 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to a first disk part 68 on a first side of the second damping members 64. The first disk part 68 is secured to and non-movable relative to a second disk part 69 on the opposite side of the second damping members 64, such as by rivets or welding. The first and second disk parts 68, 69 establish an input part to the second damping members 64.

The driven member 62 establishes an output part relative to the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is connected and non-rotatable relative to the output hub 40. The non-rotatable connection between the driven member 62 and the output hub 40 may be formed by splines or welding. Alternatively, the output hub 40 and driven member 62 may be integrally formed as a single piece with one another. A thrust bearing 76 is positioned between the output hub 40 and the first casing shell 18.

The turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. Referring to FIGS. 1 and 2, a torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) shifts the turbine-piston 32 axially in the direction of torque transmission, i.e., towards the output side of the casing 12, that is right to left in the drawings, into the lockup mode. On the other hand, a pressure decrease in the damper chamber 54 relative to the torus chamber 52 (or stated differently a pressure increase in the torus chamber 52 relative to the damper chamber 54) shifts the turbine-piston 32 axially against the direction of torque transmission, i.e., towards the input side of the casing, that is left to right in the drawings, out of the lockup mode. Pressure changes are created by controlling the fluid, e.g., hydraulic fluid or oil, in the chambers 52 and 54.

In the lockup mode depicted in FIGS. 2 and 2B, the turbine-piston 32 is displaced axially towards the impeller 30 so that the frictional ring 48 of the second engagement surface $49_2$ abuts against and is non-rotatably frictionally coupled to the first engagement surface $47_1$. In the lockup mode, torque is transferred from the engine to the casing 12, then by way of the frictional engagement between surfaces $47_1$ and $49_2$ (including the frictional lining 48 thereof) to the drive member 56 of the turbine-piston 32, then serially to the damping assembly 16 and the output hub 40, with damping members 60, 64 absorbing torsional vibration. Thereby, the lockup clutch 50 bypasses the hydrodynamic fluid coupling of the torque converter 14 and mechanically interlocks the driving and driven shafts. Notably, the friction ring 48 secured to the second engagement surface $49_2$ may have a plurality of circumferentially spaced grooves (not shown) extending generally radially for cooling friction surfaces of the lockup clutch 50 by the working fluid.

As the turbine-piston 32 with the drive member 56 moves axially into the lockup position as described above, the driving tabs 57 of the drive member 56 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 with the drive member 56 moves in the axial direction.

In the non-lockup mode, the turbine-piston 32 is displaced axially away from the impeller 30, axially moving the turbine-piston core ring 46 until the second engagement surface $49_2$ (including the frictional lining 48 thereof) is spaced from and no longer non-rotatably frictionally coupled to the first engagement surface $47_1$. Axial displacement of the turbine-piston 32 out of lockup mode releases the frictional interlocking of the engagement surfaces $47_1$, $49_2$. In the non-lockup mode, normal operation of the torque converter 14 selectively fluidly couples and decouples the impeller 30 to and from the turbine-piston 32 in hydrodynamic transmission mode.

The first embodiment also includes an annular sealing member 80 affixed to a radially outer distal end 35d of the toroidal portion of the turbine-piston shell 35, as best shown in FIGS. 1A and 2A. The sealing member 80 may be made of a frictional material (similar to frictional lining 48). A compressible elastomeric layer 82 is interposed between and bonds sealing member 80 to the radially outer distal end 35d of the toroidal portion of the turbine-piston shell 35. To provide a greater bonding interface, the turbine-piston shell 35 may increase in thickness at the radially outer distal end. In the lockup mode, the sealing member 80 engages the impeller 30, more particularly the edge of the impeller shell recess 20a at the distal end of the toroidal portion, to seal the torus chamber 52 from the damper chamber 54. The sealing engagement of the sealing member 80 in the edge of the impeller shell recess 20a, which is radially outward of the torus lockup clutch core plates 47, 49, may provide supplemental frictional engagement (additional to that of the lockup core plates 47, 49) that increases the torque capacity of the device 10. When the device 10 is out of lockup mode, the sealing member 80 is spaced from the edge of the impeller shell recess 20a to allow the flow of hydraulic fluid between the chambers 52, 54 through the narrow passage between sealing member 80 and the edge of the impeller shell recess 20a.

In operation, the lockup clutch 50 is generally activated after the hydrodynamic coupling of the driving and driven shafts reach relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring (e.g., a spring washer), may be included in the hydrokinetic torque coupling device 10, such as between the stator 34 and the turbine-piston shell 35, to axially urge the turbine-piston 32 into or out of lockup mode.

The turbine-piston 32 both forms the shell component of the turbine and the piston component of the lockup clutch 50, as described above. By consolidating two components that are normally separate from one another into a single component, space is saved in the hydrokinetic torque coupling device 10. Further, placement of the lockup clutch plates 47, 49 in the torus chamber 52 further saves space. These space-saving features provide several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment. In the interest of brevity, reference characters that are discussed above in connection with FIGS. 1-2 are not further elaborated upon below, except to the extent necessary or useful to explain the additional embodiments. The features of the embodiments described herein may be practiced with one another and are substitutable in numerous combinations.

FIG. 3 illustrates a modified second embodiment of a hydrokinetic torque coupling device 110 in which an impeller shell 120 and a turbine-piston shell 135 are radially elongated relative to the shells 20, 35 of the device 10 of FIGS. 1 and 2. A greater portion of a second outer wall portion $126_2$ extends parallel to axis X compared to second outer wall portion $26_2$ of FIG. 1. The torque converter 114, including lockup clutch core plates 147, 149 are situated farther radially outward from axis X compared to lockup clutch core plates 47, 49 of the first embodiment, providing greater lockup capacity.

Figure 4A:
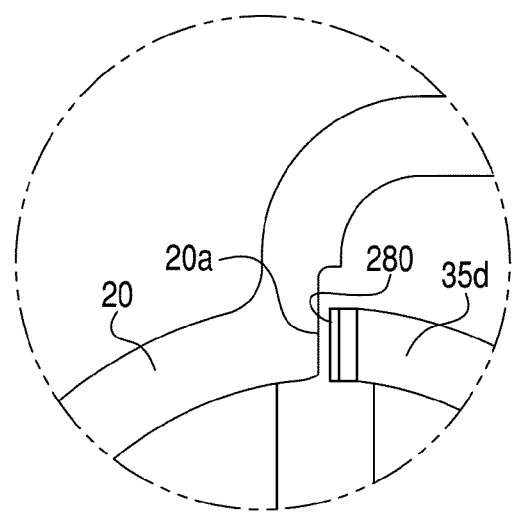
FIG. 4A is an enlarged fragmentary view of circle 4A of FIG. 4 in non-lockup mode.

FIGS. 4 and 4A show a third embodiment of a hydrokinetic torque coupling device 210 in which an annular sealing member 280, best shown in FIG. 4A, is affixed to a radially outer distal end 35d of the turbine-piston shell 35. The sealing member 280 may be made of an elastomer bonded to the radially outer distal end of the turbine-piston shell 35. To provide a greater bonding interface, the turbine-piston shell 35 may increase in thickness at the radially outer distal end 35d. In the lockup mode, the sealing member 280 engages the edge of the impeller shell recess 20a to seal the torus chamber 52 from the damper chamber 54. The sealing engagement of the sealing member 280 and the edge of the impeller shell recess 20a provides a supplemental lockup feature that increases the torque capacity of the device 210. When the device 210 is out of lockup mode, the sealing member 280 is spaced from the edge of the impeller shell recess 20a to allow the flow of hydrodynamic fluid between the chambers 52, 54 through the narrow passage between sealing member 280 and the edge of the impeller shell recess 20a.

Figure 5A:
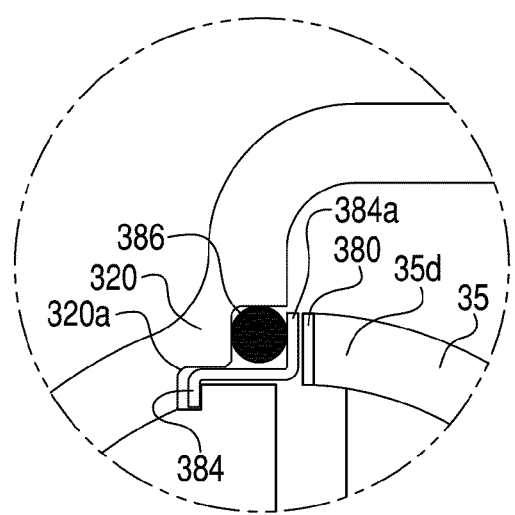
FIG. 5A is an enlarged fragmentary view of circle 5A of FIG. 5 in non-lockup mode.

A fourth embodiment illustrated in FIGS. 5 and 5A provides a hydrokinetic torque coupling device 310 including a sealing arrangement that includes a sealing member 380, similar to sealing members 80 and 280, bonded or otherwise affixed to a radially outer distal end 35d of the toroidal portion of the turbine-piston shell 35, which may have an increased thickness to provide a greater bonding interface for the sealing member 380. Located in an impeller shell double recess 320a of the impeller shell 320 is a stepped retainer ring 384 and an O-ring 386. The O-ring 386 is captured between an upper recess of the impeller shell double recess 320a and a radially outward extending leg 384a of the retainer ring 384. In the lockup mode, axial displacement of the turbine-piston shell 35 towards the impeller shell 320 causes the sealing member 380 to sealingly engage one side of the radially outward extending leg 384a of the retainer ring 384. The O-ring 386 is compressed and provides a seal between the other side of the radially outward extending leg 384a of the retainer ring 384 and the edge of the impeller shell double recess 320a.

Figure 6:
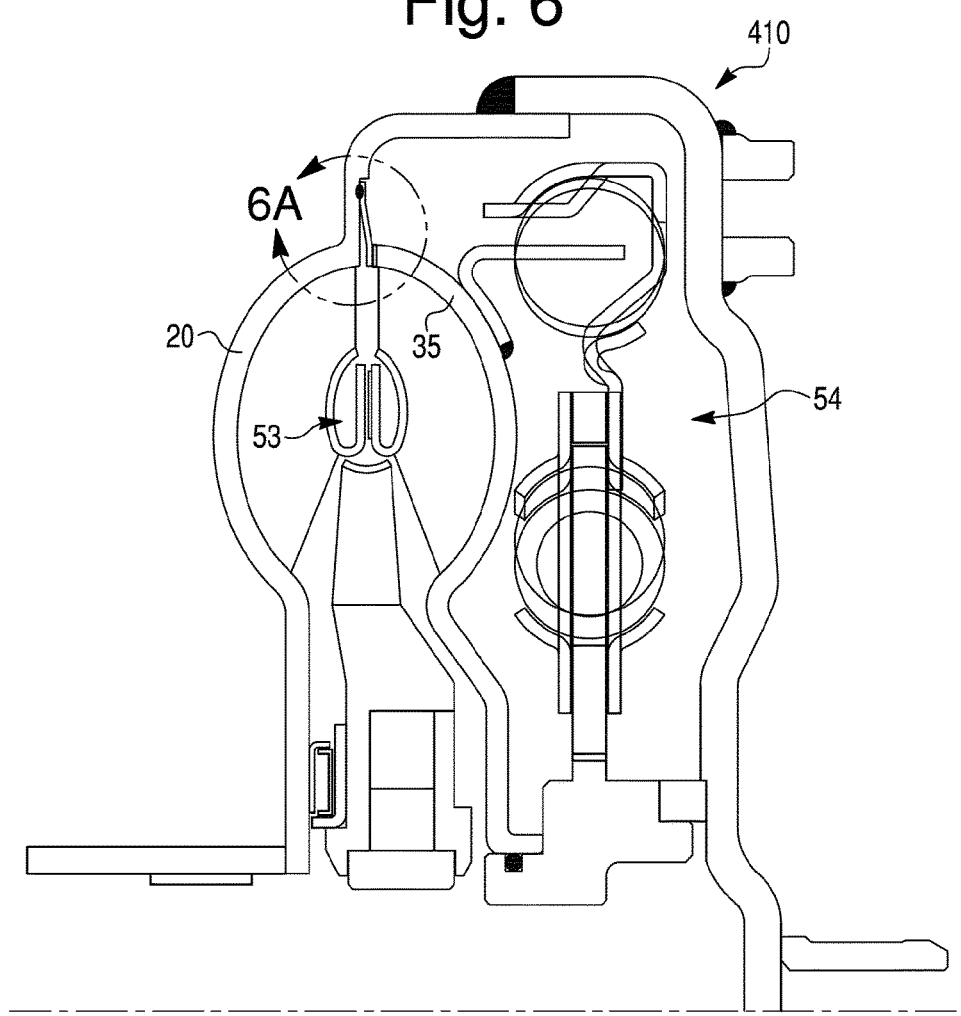
FIG. 6 is a fragmented half-view in axial cross section of a hydrokinetic torque coupling device equipped with a core lockup clutch in accordance with a fifth exemplary embodiment of the present invention.
Figure 6A:
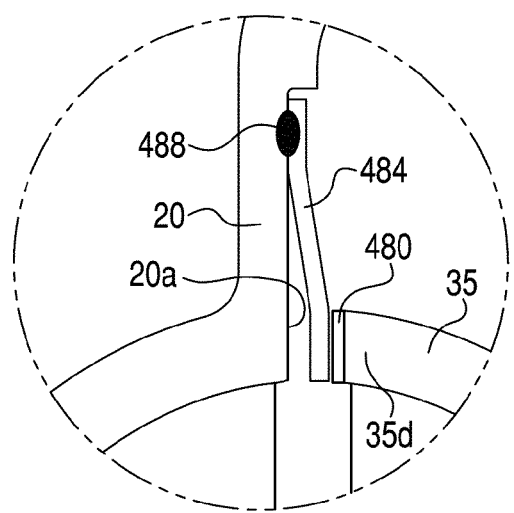
FIG. 6A is an enlarged fragmentary view of circle 6A of FIG. 6 in non-lockup mode.

FIGS. 6 and 6A illustrate a fifth embodiment of a hydrokinetic torque coupling device 410 in which a sealing member 480, similar to sealing members 80, 280, and 380, is bonded or otherwise affixed to a radially outer distal end 35d of the turbine-piston shell 35, which may have an increased thickness to provide a greater bonding interface for the sealing member 480. An annular spring plate 484 has a radially outer end welded at 488 to the surface of the impeller shell recess 20a and a radially inner end applying a biasing force against the sealing member 480 and the turbine-piston shell 35. The biasing force urges the turbine-piston 32 out of its non-lockup mode. When the biasing force is overcome, such as by reducing the pressure in the torus chamber 52 relative to the damper chamber 54, axial displacement of the turbine-piston shell 35 towards the impeller shell 20 into the lockup mode causes the sealing member 480 to engage a radially inner end portion of the annular spring plate 484 to seal the torus chamber 52 from the damper chamber 54. The biasing force of the annular spring plate 484 and an increase in the torus chamber 52 pressure axially displace the turbine-piston shell 35 out of lockup mode, spacing the sealing member 480 from the annular spring plate 484 and thereby creating a passage between the sealing member 480 and the spring plate 484 for allowing the flow of hydrodynamic fluid between the torus chamber 52 and the damper chamber 54.

Figure 7A:
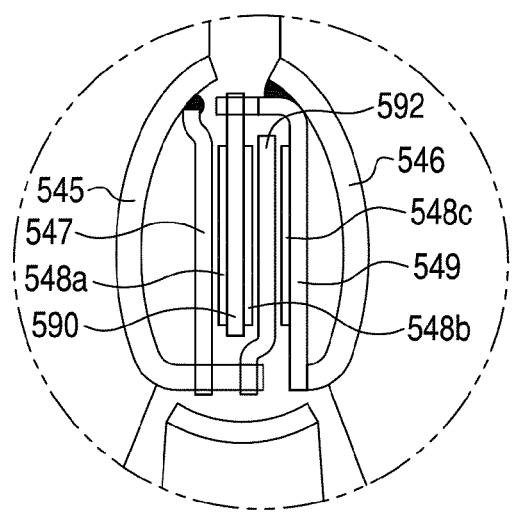
FIG. 7A is an enlarged fragmentary view of circle 7A of FIG. 7 in non-lockup mode.

A sixth embodiment illustrated in FIGS. 7 and 7A provides multiple modifications to the fifth embodiment of FIGS. 6 and 6A, though it should be understood that the modifications described in connection with this sixth embodiment may be practiced with other embodiments described herein. First, unlike the preceding embodiments, the sixth embodiment of a hydrokinetic torque coupling device 510 includes an impeller lockup clutch core plate 547 that is welded to but not integrally formed as a single piece with the impeller core ring 545, and a turbine-piston lockup clutch core plate 549 that is welded to but not integrally formed as a single piece with the turbine-piston core ring 546.

Additionally, the device 510 of the sixth embodiment includes first and second intermediate lockup clutch core plates 590 and 592. The first intermediate lockup clutch core plate 590 is axially slidingly connected to the turbine-piston lockup clutch core plate 549 using, for example, a splined connection. The second intermediate lockup clutch core plate 592 is axially slidingly connected to the impeller core ring 545 using, for example, another splined connection. Alternatively the first intermediate lockup clutch core plate 590 may be slidingly connected to the turbine-piston core ring 546, and the second intermediate lockup clutch core plate 592 may be slidingly connected to the impeller lockup clutch core plate 547. As another alternative, only one intermediate lockup clutch core plate 592 may be provided. As still another alternative, three or more intermediate lockup clutch core plates may be provided.

In the illustrated sixth embodiment, frictional linings or rings 548a and 548b are secured to opposite sides of the first intermediate lockup clutch core plate 590, and another frictional lining or ring 548c is secured to the turbine-piston lockup clutch core plate 549. It should be understood that the frictional linings may be secured to other and/or additional surfaces, e.g., one or both sides of the second intermediate lockup clutch core plate 592.

The provision of impeller and turbine-piston lockup clutch core plates 547, 549 with one or more intermediate lockup plates 590, 592 creates multiple lockup interfaces that increase the torque capacity of the lockup clutch of the sixth embodiment.

An exemplary method for assembling the hydrokinetic torque coupling device 10 according to the embodiment of FIGS. 1 and 2 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices may be practiced by sequentially performing the steps as set forth below, it should be understood that the methods may involve performing the steps in different sequences.

The impeller 30, the turbine-piston 32, the stator 34, and the damper assembly 16 may each be separately preassembled. The impeller lockup clutch core plate 47 may be integrally formed with or connected to the impeller core ring 45. The turbine-piston 32 includes, as noted above, the turbine-piston shell 35, the turbine-piston core ring 46, and the turbine blades 36 extending between and attached to the turbine-piston shell 35 and the turbine-piston core 46. The turbine-piston lockup clutch core plate 49 is integrally formed with or connected to the turbine-piston core ring 46. The lockup clutch core plates 47, 49 may be made integral as a single piece with the core rings 45, 46 by metal stamping. Alternatively, the lockup clutch core plates 47, 49 may be attached, such as by a fastener and/or welding, to the core rings 45, 46.

The impeller 30, the stator 34, and the turbine-piston 32 subassemblies are assembled together as shown in the drawings. The cylindrical flange 37 of the turbine-piston 32 is mounted to slidingly engage the output hub 40 (splined with or mounted on the driven shaft at 42) with the seal 44 therebetween. The damper assembly 16 is then added. The driving tabs 57 are engaged with the damper assembly 16 as described above. Then, the first casing shell 18 is nonmoveably and sealingly secured, such as by welding at 19, to the second casing shell 20, as best shown in FIGS. 1 and 2. The other embodiments may be similarly assembled.

Figure 8:
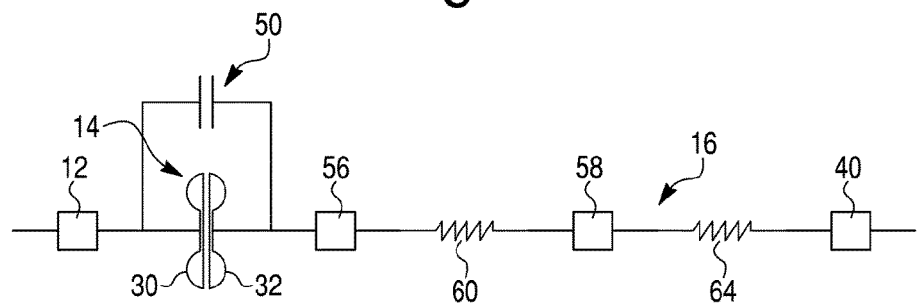
FIG. 8 is a simplified diagram of a hydrodynamic torque coupling device including a turbine-piston with dual or double damper assemblies.

The torque converters and hydrodynamic torque coupling devices described herein may incorporate different damper assemblies. For example, FIG. 8 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 8. The diagram of FIG. 8 generally corresponds to the arrangement of the embodiments shown in FIGS. 1-7.

Figure 9:
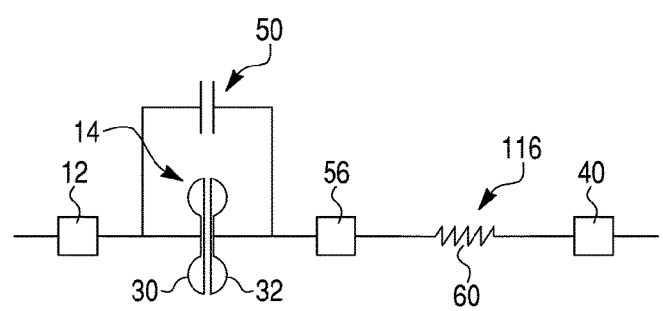
FIG. 9 is a simplified diagram of another hydrodynamic torque coupling device including a turbine-piston with a single damper assembly.

FIG. 9 shows the alternative damper assembly 116 similar to that of FIG. 8, in which the damper assembly 116 is modified to include only one set of circumferentially extending elastic damping members 60 (or 64).

Figure 10:
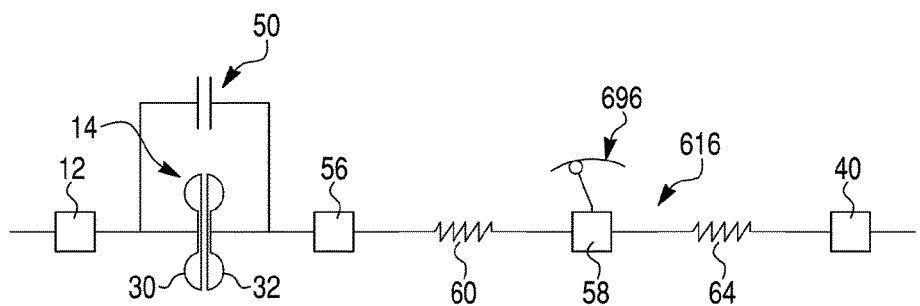
FIG. 10 is a simplified diagram of still another hydrodynamic torque coupling device including a turbine-piston with dual or double damper assemblies and a pendulum vibration absorber.

A damper assembly 616 shown in FIG. 10 is similar to that of FIG. 8, but further includes a centrifugal pendulum oscillator 696 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 696 may be coupled to the circumference of the intermediate member 58 and may be arranged on both sides of the intermediate member 58.

Figure 11:
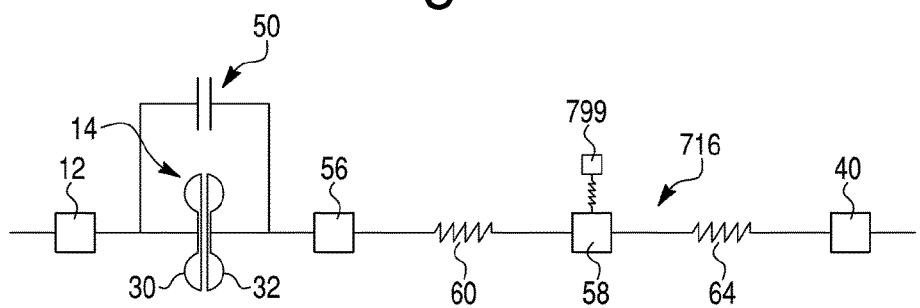
FIG. 11 is a simplified diagram of a further hydrodynamic torque coupling device including a turbine-piston with dual or double damper assemblies and a vibration absorbing spring-mass system.

A damper assembly 716 shown in FIG. 11 is similar to that of FIG. 8, but further includes a spring mass system 799 coupled to the intermediate member 58. Spring-mass systems are well known in the art and described in, for example, WO 2004/018897 to Haller. The spring-mass system 799 may be coupled to the circumference of the intermediate member 58. The spring of the spring-mass system 699 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torque converter, comprising:
   an impeller comprising an impeller core ring, an impeller shell, and a plurality of impeller blades extending between the impeller core ring and the impeller shell;
   a turbine-piston axially displaceable relative to, coaxially aligned with, and hydrodynamically drivable by the impeller, the turbine-piston comprising a turbine-piston core ring, a turbine-piston shell, and a plurality of turbine blades extending between the turbine-piston core ring and the turbine-piston shell;
   an impeller lockup clutch core plate situated between the impeller shell and the turbine-piston shell, connected to and non-rotatable relative to the impeller core ring, and having a first surface; and
   a turbine-piston lockup clutch core plate situated between the impeller shell and the turbine-piston shell, connected to and non-rotatable relative to the turbine-piston core ring, and axially displaceable with the turbine-piston to move a second surface of the turbine-piston lockup clutch core plate axially towards and away from the first surface for positioning the torque converter respectively into and out of a lockup mode in which the impeller is mechanically interlocked with the turbine-piston so as to be non-rotatable relative to the turbine-piston;
   the impeller lockup clutch core plate and the impeller core ring being separate and axially spaced from one another; and
   the turbine-piston lockup clutch core plate and the turbine-piston core ring being separate and axially spaced from one another.

2. The torque converter of claim 1, wherein the first surface or the second surface comprises a frictional lining that frictionally engages the other of the first surface or the second surface in the lockup mode.

3. The torque converter of claim 1, wherein the turbine-piston core ring and the impeller core ring collectively establish a core chamber therebetween, and wherein the impeller lockup clutch core plate and the turbine-piston lockup clutch core plate are situated in the core chamber and frictionally engage one another in the lockup mode.

4. The torque converter of claim 1, wherein the impeller lockup clutch core plate is integrally formed as a single piece with the impeller core ring, and wherein the turbine-piston lockup clutch core plate is integrally formed as a single piece with the turbine-piston core ring.

5. The torque converter of claim 1, further comprising:
   an intermediate lockup clutch core plate having opposing third and fourth surfaces interposed between and axially displaceable relative to at least one of the first and second surfaces,
   wherein in the lockup mode the first, second, third, and fourth surfaces are frictionally engaged with one another to mechanically interlock the impeller and the turbine-piston.

6. The torque converter of claim 1, further comprising:
   a plurality of intermediate lockup clutch core plates each having opposing clutch plate surfaces interposed between and axially displaceable relative to at least one of the first and second surfaces,
   wherein in the lockup mode the first and second surfaces and the clutch plate surfaces of the plurality of intermediate lockup clutch plates are frictionally engaged with one another to mechanically interlock the impeller and the turbine-piston.

7. The torque converter of claim 1, further comprising a sealing member operatively connected to a radially outer distal end of the turbine-piston shell to move into and out of sealing engagement with the impeller shell as the torque converter is positioned into and out of the lockup mode, respectively.

8. The torque converter of claim 7, wherein the sealing member comprises frictional material bonded to the radially outer distal end of the turbine-piston shell.

9. The torque converter of claim 8, further comprising a compressible elastomeric layer between the frictional material and the radially outer distal end of the turbine-piston shell.

10. The torque converter of claim 7, wherein the impeller shell includes an annular impeller shell recess having a recessed surface facing the radially outer distal end of the turbine-piston shell.

11. The torque converter of claim 10, further comprising a retainer ring and an O-ring in the impeller shell recess and operatively connected to the sealing member to provide the sealing engagement in the lockup mode.

12. The torque converter of claim 10, further comprising an annular spring plate arranged in the impeller shell recess and, in the lockup mode, operatively connected to the sealing member to provide the sealing engagement.

13. The torque converter of claim 1, further comprising a stator between the impeller and the turbine-piston.

14. A hydrokinetic torque coupling device for coupling a driving shaft and a driven shaft together, comprising:
   an impeller comprising an impeller core ring, an impeller shell, and a plurality of impeller blades extending between the impeller core ring and the impeller shell;
   a turbine-piston axially displaceable relative to, coaxially aligned with, and hydrodynamically drivable by the impeller, the turbine-piston comprising a turbine-piston core ring, a turbine-piston shell, and a plurality of turbine blades extending between the turbine-piston core ring and the turbine-piston shell;
   a casing comprising a casing shell connected to the impeller shell;
   a damper assembly comprising an input part operatively connected to the turbine-piston and an output part operatively connectable to an output hub;
   an impeller lockup clutch core plate situated between the impeller shell and the turbine-piston shell, connected to and non-rotatable relative to the impeller core ring, and having a first surface;
   a turbine-piston lockup clutch core plate situated between the impeller shell and the turbine-piston shell, connected to and non-rotatable relative to the turbine-piston core ring, and axially displaceable with the turbine-piston to move a second surface of the turbine-piston lockup clutch core plate axially towards and away from the first surface for positioning the hydrokinetic torque coupling device respectively into and out of a lockup mode in which the turbine-piston is mechanically interlocked with the casing so as to be non-rotatable relative to the casing.

15. The hydrokinetic torque coupling device of claim 14, further comprising a stator situated between the impeller and the turbine-piston.

16. The hydrokinetic torque coupling device of claim 14, wherein the turbine-piston is axially displaceable towards an output side of the hydrokinetic torque coupling device in order to frictionally couple the first and second surfaces together and position the hydrokinetic torque coupling device in the lockup mode, and wherein the turbine-piston is axially movable towards an input side of the hydrokinetic torque coupling device so that the first and second surfaces are not frictionally coupled and the hydrokinetic torque coupling device is not in the lockup mode.

17. The hydrokinetic torque coupling device of claim 14, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

18. The hydrokinetic torque coupling device of claim 14, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

19. A method of assembling a hydrokinetic torque coupling device for coupling a driving shaft and a driven shaft together, comprising:
   providing a torque converter comprising
      an impeller comprising an impeller core ring, an impeller shell, and a plurality of impeller blades extending between the impeller core ring and the impeller shell;
      a turbine-piston axially displaceable relative to, coaxially aligned with, and hydrodynamically drivable by the impeller, the turbine-piston comprising a turbine-piston core ring, a turbine-piston shell, and a plurality of turbine blades extending between the turbine-piston core ring and the turbine-piston shell;
      an impeller lockup clutch core plate situated between the impeller shell and the turbine-piston shell, connected to and non-rotatable relative to the impeller core ring, and having a first surface, the impeller lockup clutch core plate and the impeller core ring being separate and axially spaced from one another; and
      a turbine-piston lockup clutch core plate situated between the impeller shell and the turbine-piston shell, connected to and non-rotatable relative to the turbine-piston core ring, and having a second surface, the turbine-piston lockup clutch core plate and the turbine-piston core ring being separate and axially spaced from one another; and
   operatively connecting the torque converter to a casing shell and a damper assembly including an input part and an output part operatively connectable to an output hub to assemble the hydrokinetic torque coupling device comprising a casing including the casing shell, wherein the turbine-piston lockup clutch core plate is axially displaceable with the turbine-piston to move the second surface of the turbine-piston lockup clutch core plate axially towards and away from the first surface for positioning the hydrokinetic torque coupling device respectively into and out of a lockup mode in which the turbine-piston is mechanically interlocked with the casing so as to be non-rotatable relative to the casing.

* * * * *